United States Patent [19]

Moffett

[11] Patent Number: 4,567,571
[45] Date of Patent: Jan. 28, 1986

[54] MEMORY CONTROL FOR REFRESHING IN A STEP MODE

[75] Inventor: Richard C. Moffett, Phoenix, Ariz.

[73] Assignee: Honeywell Information Systems, Inc., Phoenix, Ariz.

[21] Appl. No.: 702,112

[22] Filed: Feb. 15, 1985

Related U.S. Application Data

[63] Continuation of Ser. No. 415,130, Sep. 7, 1982, abandoned.

[51] Int. Cl.[4] .............................................. G06F 13/00
[52] U.S. Cl. .................................... 364/900; 365/222
[58] Field of Search ... 364/200 MS File, 900 MS File; 365/222

[56] References Cited

U.S. PATENT DOCUMENTS

| | | | |
|---|---|---|---|
| 4,106,108 | 8/1978 | Cislaghi et al. | 365/222 |
| 4,293,926 | 10/1981 | Amano | 364/900 |
| 4,387,423 | 6/1983 | King et al. | 364/200 |
| 4,403,308 | 9/1983 | Girard | 365/222 |
| 4,433,395 | 2/1984 | Iyehara et al. | 365/222 |

*Primary Examiner*—Harvey E. Springborn
*Attorney, Agent, or Firm*—A. A. Sapelli; J. S. Solakian; L. J. Marhoefer

[57] ABSTRACT

In a computer system, there is included a memory unit which includes a volatile memory store, and a memory control circuit connected with the memory unit thereby permitting the computer system to be operated in a step mode, the memory control circuit comprising a step clock generator which generates a gated clock signal. A register element receives a step command signal, an indication from the computer system that the memory unit is to be operated in the step mode, and generates the step mode control signal in response to said step command signal. A shift register receives a strobe command signal from the computer system indicating a request for a memory cycle, and delays the strobe command signal, each stage of the shift register representing a successive step when the computer system is operated in the step mode. A selector, connected to a first stage of the shift register receives a delayed strobe command signal, and is connected to a second stage of the shift register to receive a further delayed strobe command signal, selects between the delayed strobe command signal and the further delayed strobe command signal to output a selected strobe command signal in response to the step mode control signal. A memory unit timing unit receives the selected strobe command signal, the free running clock signal, and a refresh request signal, correlates the selected strobe command signal to the refresh request signal, to output an initiate cycle signal thereby initiating the memory cycle requested by the computer system and a memory refresh cycle of the volatile memory store when the correlation occurs.

2 Claims, 5 Drawing Figures

F I G. I

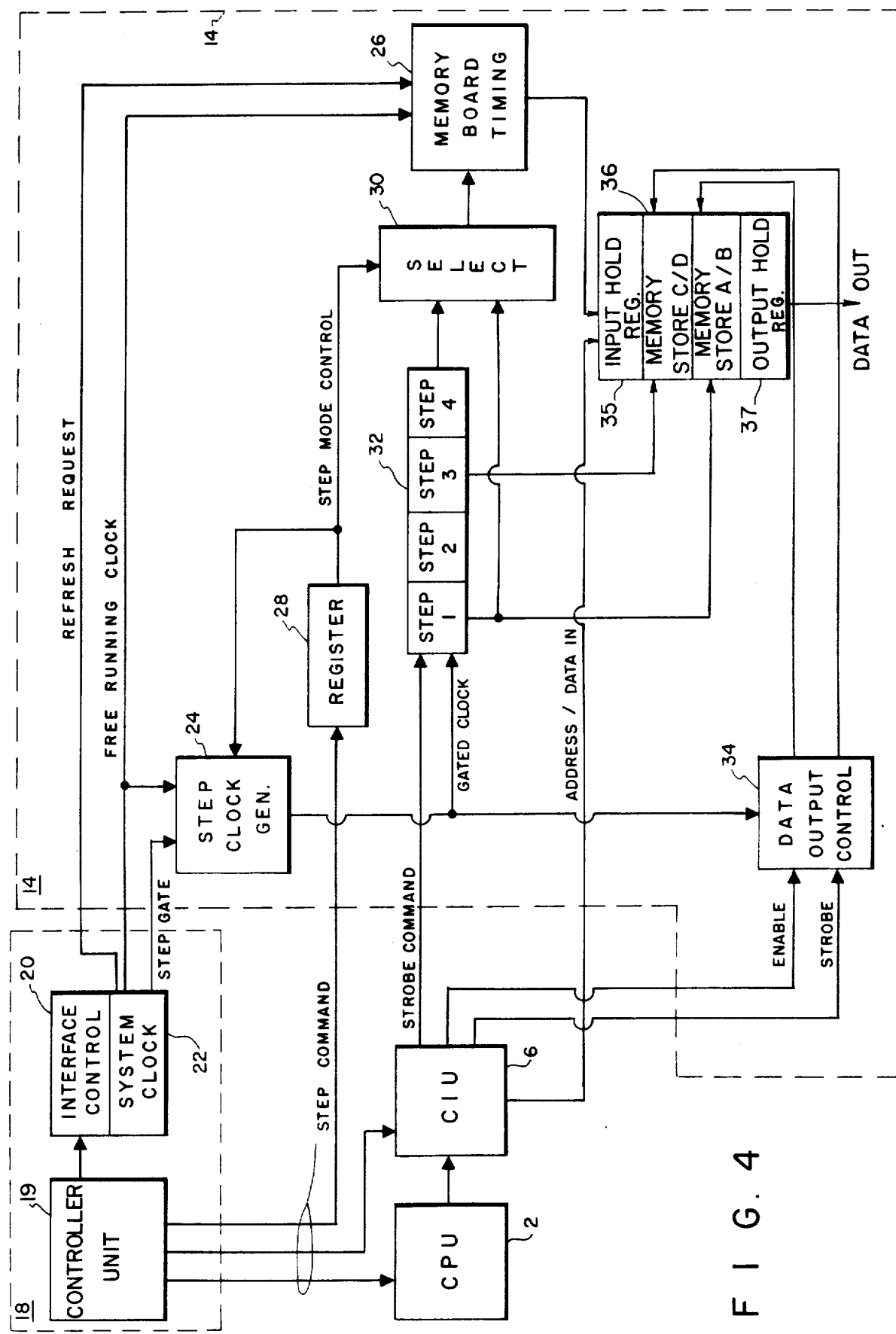
F I G. 4

MEMORY CONTROL FOR REFRESHING IN A STEP MODE

This is a continuation of application Ser. No. 415,130 filed on Sept. 7, 1982, now abandoned.

BACKGROUND OF THE INVENTION

The present invention relates to computer apparatus. More particularly, it relates to apparatus for controlling the operation of a computer memory.

One form of memory unit for a computer is a volatile memory wherein the memory cells must be periodically refreshed in order to maintain the information stored in that memory. There have been many circuits provided for controlling the refreshment of such memory cells. One such refresh control circuit is shown in a copending application of Richard C. Moffett, Ser. No. 387,732. In that case, apparatus is provided for the periodic refreshing of memory cells in groups while providing logic elements for avoiding access conflicts between the refresh operation and data transactions in the memory.

Another feature of computer operations is that both the software and the hardware must be debugged. An effective way of debugging in the system is to put the operation into a so-called step mode where a transaction is accomplished one step at a time. The result of each step may then be checked to determine where an error has occured, that it may be corrected. Such a step mode is, or may be, accomplished by inhibiting a normal free running clock and issuing controlling clock pulses on a step by step basis.

In a static memory, such a step mode presents no problem. In a voltile memory, such as a MOS memory, however, the step mode must be reconciled with a need for a periodic refreshment of the memory cells. The memory timing must be uninterrupted to protect the memory devices. So far as is here known, the problem has not been previously addressed.

SUMMARY OF THE INVENTION

It is, accordingly, an object of the present invention to provide an improved memory control circuit which allows a computer with a volatile memory to be operated in step mode.

It is another object of the present invention to provide an improved memory control circuit as set forth wherein no interference occurs between a said step mode and memory refresh.

In accomplishing these and other objects, there has been provided, in accordance with the present invention, a memory control circuit. In a computer system, there is included a memory unit which includes a volatile memory store, and a memory control circuit connected with the memory unit thereby permitting the computer system to be operated in a step mode. The memory control circuit comprises a step clock generator element, having a first, second, and third input terminal which receive a free running clock signal, a step gate signal, and a step mode control signal, respectively, for generating a gated clock signal, the gated clock signal coupled to the volatile memory store, and the free running clock signal supplying a basic timing for the computer system. A register element, having an input terminal which receives a step command signal, the step command signal being an indication from the computer system that the memory unit is to be operated in the step mode, generates the step mode control signal in response to the step command signal, the step mode control signal being coupled to the third input terminal of the clock generator element. A shift register element having a plurality of stages, further having an input terminal which receives a strobe command signal from the computer system, the strobe command signal indicating a request for a memory cycle, and having a second input terminal operatively connected to the step clock generator element for receiving the gated clock signal, a first stage of the shift register element having an output operatively connected to the volatile memory store, delays the strobe command signal, each stage of the shift register element representing a successive step when the computer system is operated in the step mode. A selector element, having a first input terminal operatively connected to a first stage of the shift register element to receive a delayed strobe command signal, and having a second input terminal operatively connected to a second stage of the shift register element to receive a further delayed strobe command signal, selects between the delayed strobe command signal and the further delayed strobe command signal to output a selected strobe command signal in response to the step mode control signal. A memory unit timing element, operatively connected to the selector element to receive the selected strobe command signal, and having a first and second input terminal which receive receive the free running clock signal, and a refresh request signal, respectively, correlates the selected strobe command signal to the refresh request signal, to output an initiate cycle signal thereby initiating the memory cycle requested by the computer system and a memory refresh cycle of the volatile memory store when the correlation occurs.

BRIEF DESCRIPTION OF THE DRAWINGS

A better understanding of the present invention may be had from the following detailed description when read in the light of the accompanying drawings in which:

FIG. 4 is a schematic block diagram illustrating the present invention; and

DETAILED DESCRIPTION

Figure 1:
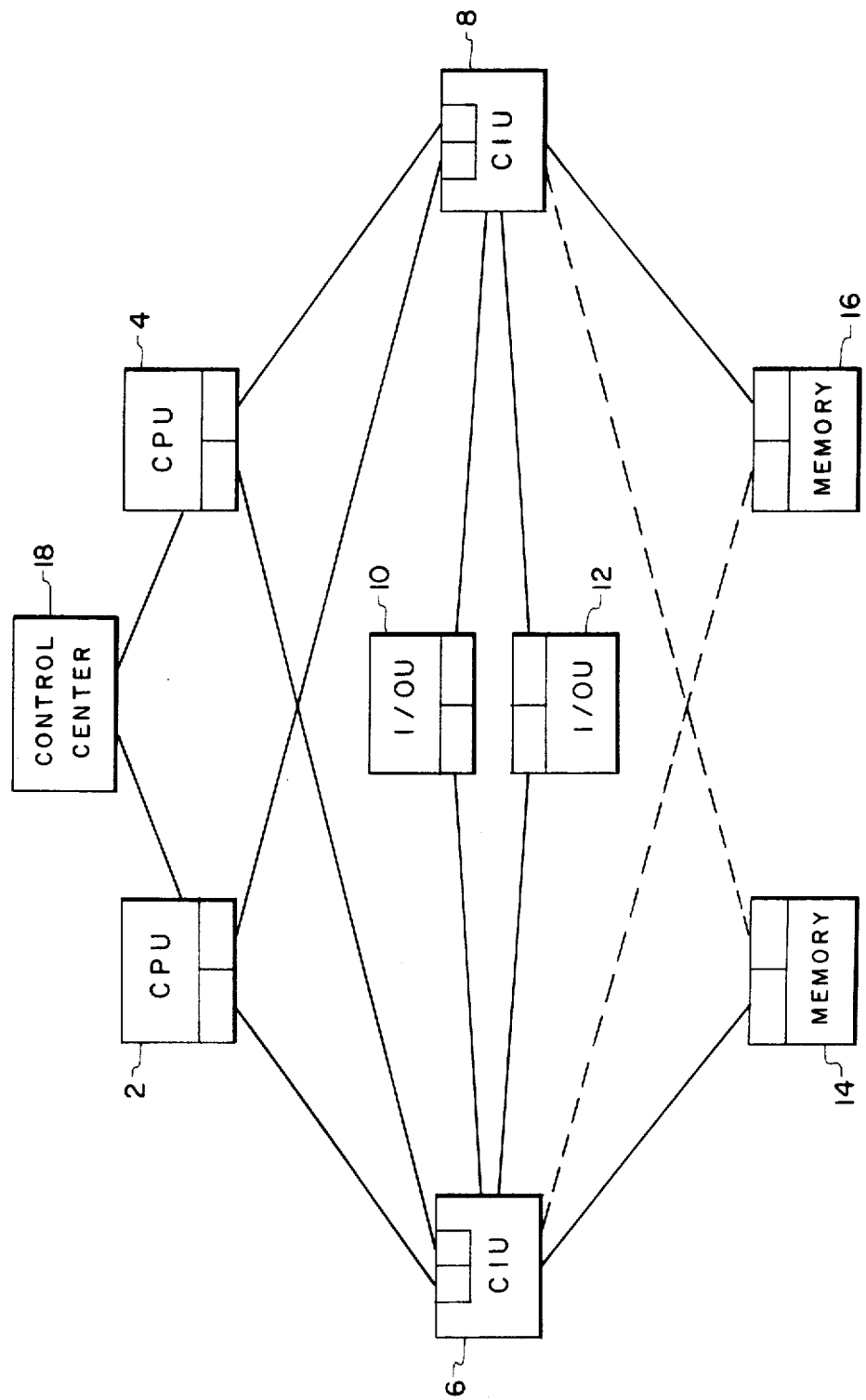
FIG. 1 is a block diagram of a computer system in which the present invention may be embodied.

Referring now to the drawings in more detail, there is shown in FIG. 1 a computer system in which the present invention may be embodied. The illustrated computer system or more simply referred to as system, features a distributed operational characteristic. As shown, the system includes a first central processor unit (CPU)2 and a second central processor unit (CPU) 4. There is also provided a first central interface unit (CIU) 6 and a second central interface unit (CIU)8. The first CPU 2 is coupled to, thereby permitting communication with, both the first CIU 6 and the second CIU 8. Similarly, the second CPU 4 is coupled to, thereby permitting communication with the first CIU 6 and the second CIU 8. One or more input/output units (I/O U)10 and 12, respectively, are provided. These units basically provide a multiplexed interconnect between the CIUs 6 and 8 and the input/output peripheral units (not shown) of the system. A first memory unit 14 (also referred to herein as main memory unit or MMU) is connected to be associated with the first CIU 6. Similarly, a second memory unit 16 is connected to be associated with the second CIU 8. In such a system, the central processor units 2 and 4 perform the usual computational manipulation of data.

Data is received from or transmitted to the input/output unit 10. The central interface units 6, 8 provide, among other things, a traffic management function between the central processor units, the input/output units and the associated memory units.

The memory units 14 and 16 provide a storage place for original data as well as data which has been manipulated by the CPUs. In the system herein set forth, it will be noticed that each of the central interface units 6 and 8 may be in direct communication with either of the two central processor units 2 and 4. Both of the central interface units are in communication with the input/output units 10 and 12. Additionally, each of the two CIUs has the capability of communicating directly with the memory unit associated with the other half of the system. Thus it may be seen that there is an intercommunication capability between the two halves of the illustrated systems.

Because of that intercommunication capability, it is necessary that the several components of the system be all synchronized with respect to each other. To this end there is provided a control center 18. The control center 18 is, in effect, a further CPU whose function is to define the basic control operations for the system, including the synchronization of the operating units.

The structure illustrated in FIG. 1 is set forth for the purpose of illustrating the environment in which the present invention operates.

Figure 2:
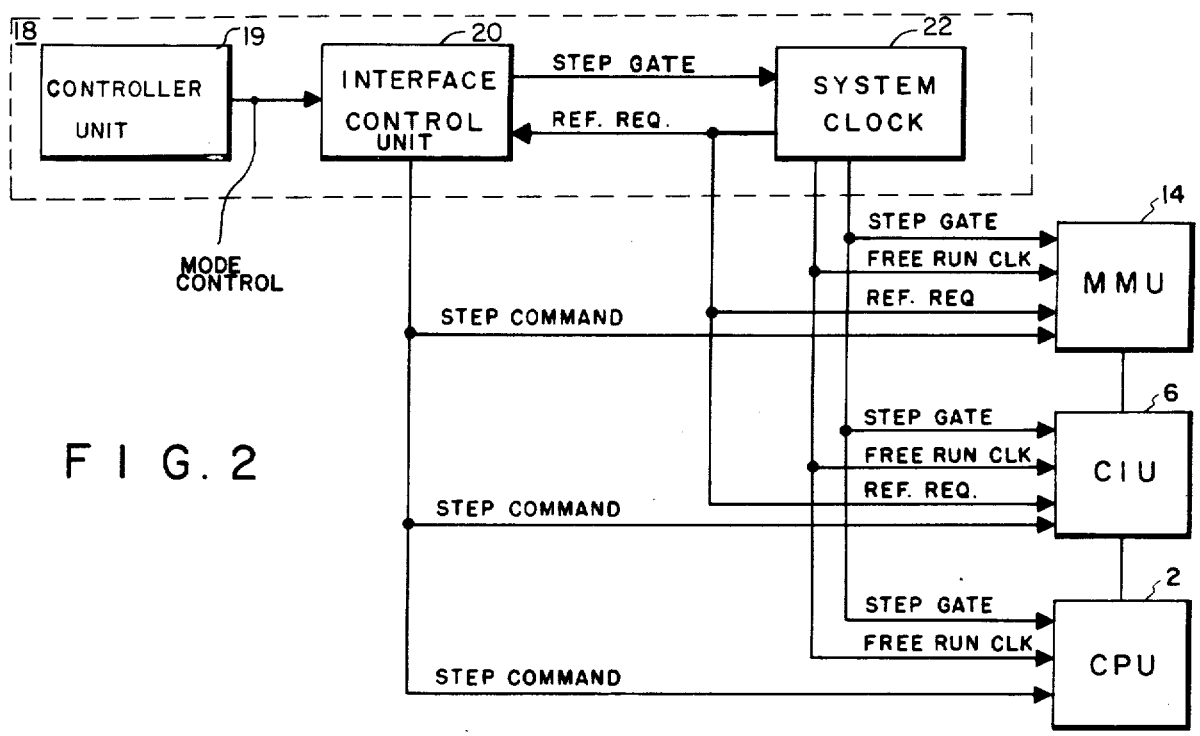
FIG. 2 is a schematic block diagram of a portion of the computer system shown in FIG. 1 showing somewhat more details of the structure.

In FIG. 2 there is shown an aspect of the interconnection between several units of the system shown in FIG. 1 and relating to the operation of the present invention. One aspect of the control function exercised by the control center 18 is, under the control of the system operator, to effectively set the system in a step mode. This is accomplished by enabling a control signal which is applied to an appropriate input control in each of the CPU 2, the CIU 6, the main memory 4 and an interface control unit 20 to be described hereinunder.

The interface control unit 20 has a number of functions in the system which are not related to the present invention. It does have a function, however, that is related to the present invention, a system clock unit 22. The system clock unit 22 provides a stable free running clock (FREE RUN CLK) signal which constitutes the basic timing for the computer system. That free running clock signal is supplied to the main memory unit (MMU) 14, the CIU 6 and the CPU 2.

Another feature of the system clock 22 is that on a regularly scheduled basis, there will be provided a refresh request (REF REQ) signal and a refresh address signal (not shown) which are used to initiate a memory refresh cycle in one of a plurality of memory banks of MMU 14. The refresh request signal is supplied from the system clock unit 22 to the interface control unit 20, to the main memory unit 14 and to the CIU 6. If the controller unit 19 has issued a control (MODE CONTROL) signal to place the system in a step mode of operation, the refresh request signal applied to the input of the interface control unit 20 will be used to trigger a step clock (STEP GATE) signal as an output from the interface control unit 20. The step clock signal is returned to the system clock unit 22 from which it is distributed to the main memory unit 14, the CIU 6 and the CPU 2. When the main memory unit 14, the CIU 6 and the CPU 2 have been placed in the step mode by the control center 18 by a control signal STEP COMMAND, these units are conditioned to be responsive to the step clock signal to effect a step operation as hereinbefore mentioned, whereby the system may be debugged.

Figure 3:
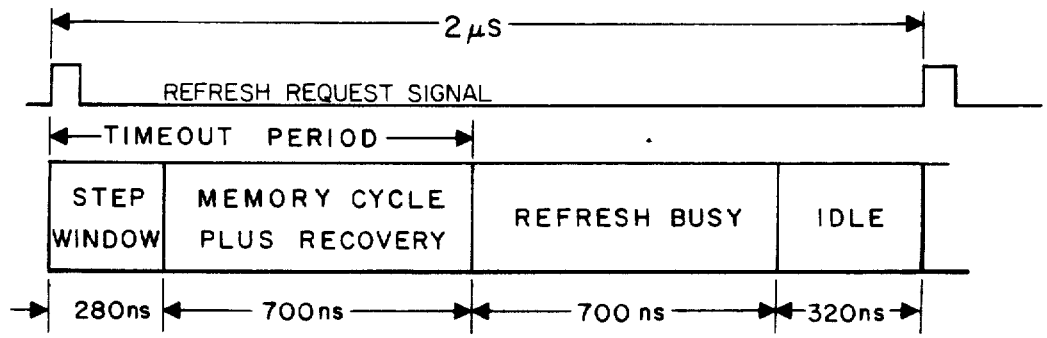
FIG. 3 is a timing diagram useful in understanding the present invention.

In an exemplary apparatus constructed in accordance with the present invention, the system clock operates on a 35 nanosecond cycle. In the same system, a refresh request signal is generated every two microseconds. This relationship is illustrated in FIG. 3. Also shown in FIG. 3 is a diagram of certain timing relationships prevailing within the memory unit 14. The leading or positive edge of the refresh request signal initiates the timing of a step window which, in the exemplary embodiment, is defined at 280 nanoseconds. If a step clock signal is to be applied to the memory unit, it must occur during that step window. It should be noted that not every step clock signal will initiate a memory cycle. Only those step clock signals which are accompanied by a strobe command signal (see FIG. 4) will initiate such a memory cycle. The other step clock signals will be used to step the operations other than a memory cycle. This feature will be discussed in more detail hereinafter. Following the step window period there is a memory cycle period which, in the exemplary embodiment is defined as 700 nanoseconds. If a step clock signal had occured during the step window period the following memory cycle and recovery period would provide adequate time for the execution of a complete memory cycle and the recovery of the system. Following the 700 nanosecond memory cycle period, a delay circuit (not shown) initiated by the refresh request pulse will have timed out and signalled the beginning of a refresh cycle. The following period defined as refresh busy is also, in the exemplary embodiment, designated at 700 nanoseconds. Following that 700 nanosecond refresh busy period, there is a 320 nanosecond idle period. At the end of the idle cycle there will occur a second refresh request signal to start the cycle again.

In FIG. 4, there are illustrated circuit elements through which the relationships defined in connection with FIG. 3 are accomplished. Here again the control center 18 is in communication with the CPU 2 and the CIU 6 for the control of the operational functions of those two units. Although only one of the CIU, CPU and memory units is illustrated, the other half of the system is identical to the illustrated half. The controller unit 19 is also connected to the interface control unit 20 and, through it, to the system clock 22. As noted in FIG. 2, the outputs of the system clock include a free running clock signal which defines the basic timing unit of the CPU 2, including the MMU 14. To this end the free running clock signal is connected to the memory unit 14. Additionally, from the system clock, under control of signals transmitted from the controller unit 19, is the step clock signal (STEP GATE) which is applied as an input to the memory unit 14. Included among the control signals issued from the control center 18 to the CPU 2, the CIU 6 and the memory unit 14 is the step command signal. This signal is used to place each of the designated units in a step mode of operation.

In FIG. 4, those elements of the memory unit 14 which are relevant to the present invention are shown in greater detail. More specifically, the step gate signal and the free running clock signal from the system clock 22 are applied as input signals to a step clock generator 24. The free running clock signal is also applied as an input signal to the memory board timing unit 26. Similarly, the refresh request signal is connected to the interface control unit 20 (not shown), and also as an input to the memory board timing unit 26. The memory board timing unit 26 may be substantially a counter for counting the free running clock pulses and having output signals at appropriate counts.

The step command signal from the control center 18 is applied as an input signal to one element of a register 28. The output of the register 28 comprises the step mode control signal for the memory unit 14. The step mode control signal from the register 28 is applied as a control signal to a selector 30. The output of the step clock generator 24 is in the nature of a gated clock signal which is applied as one input to a shift register 32. The gated clock signal is also applied as a input control signal to a data output control unit 34. A second input to the shift register 32 is a strobe command signal from the CIU 6. The strobe command signal is a signal which, when applied through the shift register 32 and the select mechanism 30 to the memory board timing circuit 26, will initiate a memory cycle.

The register 32 is, in the present embodiment, a four stage register, each stage of which represents a successive step when the system is operated in the step mode. The output of the first stage of the register 32 is connected as a first input to the selector 30. The output of the first stage is also connected to one half of a memory store 36. The output of the third stage of the register 32 is connected to the second half of the memory store 36. The output of the fourth stage is connected as a second input signal to the selector 30. The output of the selector 30 is connected as an input control signal to the memory board timing unit 26.

The memory store 36, in the exemplary embodiment, comprises a plurality of memory board units which are divided into a first board group and a second board group. Each of the board groups is divided into a first and second memory section. Thus the first memory board group includes memory sections A and B, while the second memory board group contains sections C and D. By means of the shift register 32, first one then the other of the memory board groups are addressed by the strobe command signal to place alternate words in the two memory board groups. Each of the two memory board groups will have identical addresses for the data input signals.

Again, in the exemplary embodiment of the invention, the memory store 36 is formed with input holding register 35 at the input thereof for the temporary storage of input data prior to its being lodged at the designated memory address. Similarly, there is provided output holding register 37 for the temporary storage of data read from the designated memory address before it is stepped out of memory.

As hereinbefore noted, the memory itself, must be operated on a continuous, uninterrupted clock basis in order to protect the memory devices. Thus the memory cycle, once initiated, must operate at the rate of the free running clock signal; it may not be operated at step signal rate. The input and output holding registers provide the necessary buffering between the actual memory and the remainder of the system operating in step mode.

Figure 5:
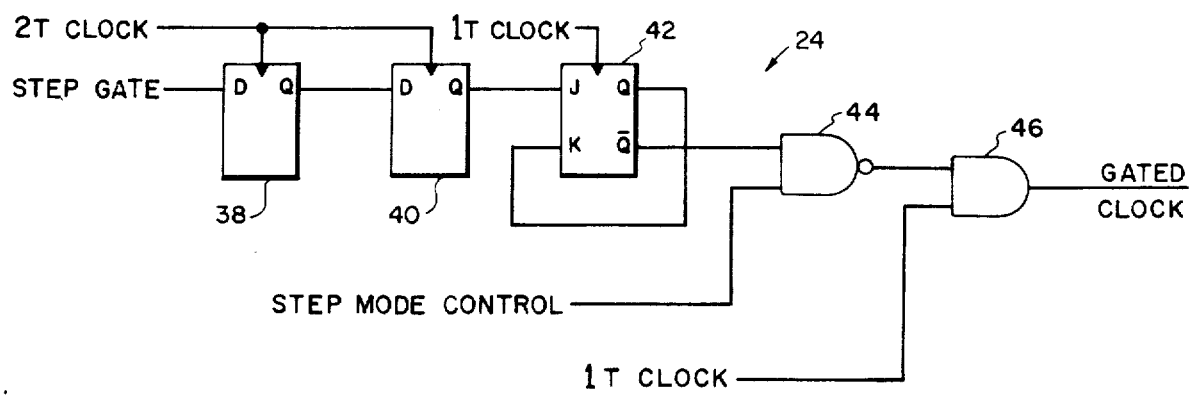
FIG. 5 is a schematic logic diagram of one of the elements of FIG. 4.

In FIG. 5 there is illustrated representative logic circuitry such as may be used for the step clock generator 24 illustrated in FIG. 4. Under the control of the control center 18, the interface control unit 20 and system clock 22 provide, first, a step gate signal which is applied to the D input of a first flip flop 38. The flip flop 38 is triggered by a two-T clock signal applied to the clock input terminal thereof. The two-T clock signal is derived from and is one half the frequency of the free running clock signal from the system clock 22. The free running clock signal is also identified herein as a one-T clock signal, one-T representing the time of one cycle of the free running clock signal.

The Q output of the flip-flop 38 is connected to the D input of a second flip-flop 40. The flip-flop 40 also has the two-T clock signal connected to its clock input terminal. The Q output of the flip-flop 40 is connected to the J input terminal of a J-K flip-flop 42. The Q output of the flip-flop 42 is connected back to its own K input terminal. A one-T clock signal is applied to the clock input terminal of the flip-flop 42. The $\bar{Q}$ output terminal of the flip-flop 42 is applied as one input terminal to a NAND gate 44. The second input terminal of a NAND gate 44 is the step mode control signal which is the output of the register 28 in FIG. 4. The output of the NAND gate 44 is connected as one input to an AND gate 46. The second input terminal of the AND gate 46 is connected to the one-T clock signal. The output of the AND gate 46 is the gated clock signal which, as shown in FIG. 4 is connected to the input of the shift register 32 and the data output control unit 34.

If the control center 18 has dictated that the apparatus shall be operated in the step mode, the STEP GATE signal will be issued from the system clock 22 to the input of the step clock generator 24. There will also be the step command signal from the control center 18 to the input of the register 28, thereby setting that register to produce the step mode control signal. The flip-flops 38 and 40 provide a short delay which is, in the illustrative embodiment, a feature necessary for other elements of the system but not necessary to the present invention. The delayed step gate signal output from the flip-flop 40 to the input of the flip-flop 42 causes that flip-flop to produce a one-T clock pulse at the $\bar{Q}$ output of the flip-flop 42. That one-T clock pulse is a negative pulse, which produces a logical low for that period at the input of the NAND gate 44. The other input to the NAND gate 44 will be at a logical high since the step mode control signal is active. The logical low at the first input of the NAND gate 44 causes a resulting logical high at the output of that gate. That logical high output constitutes a logical high input for the first input terminal of the AND gate 46. When the logical high at the first input of the AND gate 46 coincides with the logical high portion of the one-T clock signal at the other input terminal thereof, there is a resulting one-T wide gated clock signal.

On the other hand, if the control center 18 has designated that the system is to be run in normal mode rather than step mode, there would be no step gate signal issuing from the system clock 22. Nor would there be a step command signal from the control center 18 to the register 28. As a result, the step mode control signal issuing from the register 28 would be at a logical low. With the step gate signal at a logical low the output from both the flip-flop 38 and flip-flop 40 would be a logical low, and it doesn't matter what the output of the flip-flop 42 is. The logical low at the second input terminal of the NAND gate 44 produces a logical high at the output thereof. This results in a steady state logical high signal at the first input terminal of the AND gate 46. With that logical high signal at the first terminal, the one-T clock signal at the second terminal causes the output of the AND gate 46 to be a one-T cycling gated clock signal. That gated clock signal is, in effect, identical with the free running clock.

With that as background, it may be seen that in a normal or non-step mode operation, the strobe command for a memory cycle, issued by the CIU 6, will be applied to the first stage of the shift register 32 and immediately gated into the input of the select unit 30. With the step mode control signal from the register 28 having a logical low, the selector 30 is configured to select for transmission to the memory board timing unit 26 the output of the first stage of the shift register 32. The memory board timing unit 26 then initiates the memory cycle which is operated on the free running clock rate.

The output from the first stage of the shift register 32 is also applied to identify and enable the first data word to be registered on the first half, or board group, of the memory store 36. The address and/or data information from the CIU is supplied to the both halves of memory unit 36. The shift register 32 is stepped by the gated clock from the step clock generator 24. And the normal mode of operation, that gate clock, as noted, is at the free running clock rate. Thus, each successive stage of the shift register 32 produces a delay of one-T time reference. The output from the third stage or step three of the shift register 32 enables the second data word to be registered on the second memory board group of the memory unit 36. The placing of alternate words of data in the separate memory segments permits a more effective and efficient use of the memory 14.

As hereinbefore mentioned, the strobe command signal issued by the CIU is correlated with the refresh request signal which is applied both to the CIU and to the memory board timing unit. The leading edge of the refresh signal, as shown in FIG. 3, initiates the timing cycle of the memory board timing unit 26. The step window defined by the memory board timing unit 26 is, as shown, 280 nanoseconds in length. This window is the equivalent, in the illustrative embodiment, of eight cycles of the free running clock. The strobe command signal is received by the memory board timing unit, by way of the shift register 32 during the step window interval. The receipt of the strobe command signal by the memory board timing unit 26 and the memory store 36 triggers the beginning of the memory cycle, as shown in FIG. 3. The memory cycle period is indicated as being at least 700 nanoseconds in length. If the strobe command is received early in the step window interval, then more time will be allotted to the memory cycle period. During that interval the memory unit is activated to either a read or a write operation depending upon the nature of the command issued thereto. At the end of the period designated memory cycle, the refresh cycle of the memory units begins and continues for the period of 700 nanoseconds. With the issuance of the next refresh request signal, the next step clock will be issued.

When the system has been placed in a step mode operation, the output of the step clock generator 24 is a series of steps controlled from the control center 18 through the interface control unit 20 and the system clock 22. These steps are or may be, aperiodic.

In the step mode operation, the strobe command is clocked into the first stage of the shift register 32 by the gated clock signal. The gate clock signal now issues one clock pulse for each step gate signal issued from the system clock 22. The selector 30 will have been configured to transmit to the memory board timing unit 26 the output signal from the fourth stage of the shift register 32 rather than the signal from the first stage. Thus the shift register 32 comprises a delay circuit for the strobe command signal before it is applied to the memory board timing unit 26. This delay permits the address and the data to be presented to the memory store 36 and stored in the input holding register 35 before the memory cycle is initiated.

When the system has been configured for a write mode, the memory unit timing unit 26 begins the cycle as set forth in FIG. 3 wherein there is provided a step window and a memory cycle time covering an interval of 980 nanoseconds, in the exemplary embodiment. At the end of that period, the refresh operation becomes effective.

In the read mode, the address data is supplied to the two memory store 36 and, during the memory cycle interval, the data at the designated address is read out to the set of output holding registers 37 of the memory store 36, ready to be stepped out of those holding registers by the next gated clock signal applied to the data output control unit 34.

Thus the arrangement herein disclosed provides an apparatus for accommodating a step mode of operation for a computer system while not interrupting the free running clock timing of the memory unit itself and again, provides means for accommodating the necessary memory refresh cycles on a free running clock time basis.

The embodiments of the invention in which an exclusive property or privilege is claimed are defined as follows:

1. A computer system, having a memory unit which includes a volatile memory store, and a memory control circuit connected to said memory unit for permitting the computer system to be operated in a step mode, said memory control circuit comprising:
  (a) step clock generator means, having a first, second, and third input terminal adapted to receive a free running clock signal, a step gate signal, and a step mode control signal, respectively, for generating a gated clock signal, said gated clock signal coupled to at least said volatile memory store, said free running clock signal supplying a basic timing for said computer system;
  (b) register means, having an input terminal for receiving a step command signal, said step command signal being an indication from said computer system that the memory unit is to be operated in the step mode, for generating the step mode control signal in response to said step command signal, said step mode control signal being coupled to the third input terminal of said step clock generator means;
  (c) shift register means having a plurality of stages, further having an input terminal for receiving a strobe command signal from the computer system, said strobe command signal indicating a request for a memory cycle, and having a second input terminal operatively connected to the step clock generator means for receiving said gated clock signal, a first stage of said shift register means having an output operatively connected to said volatile memory store for delaying the strobe command signal, each stage of said shift register means representing a successive step when the computer system is operated in the step mode;

(d) selector means, having a first input terminal operatively connected to said first stage of said shift register means to receive said delayed strobe command signal, and having a second input terminal operatively connected to a second stage of said shift register means to receive a further delayed strobe command signal, for selecting between said delayed strobe command signal and said further delayed strobe command signal to output a selected strobe command signal in response to the step mode control signal; and (e) memory unit timing means, operatively connected to said selector means to receive the selected strobe command signal, and having a first and second input terminal which receive the free running clock signal, and a refresh request signal, respectively, for correlating the selected strobe command signal to the refresh request signal to output an initiate cycle signal thereby initiating the memory cycle requested by the computer system and a memory refresh cycle of said volatile memory store when said correlation occurs.

2. A memory control circuit according to claim 1, wherein said step clock generator means comprises:

(a) first bistable circuit, having an input terminal adapted to receive said step gate signal, a clocking input terminal adapted to receive a clocking signal which is one half the frequency of the free running clock signal;

(b) second bistable circuit, having an input terminal operatively connected to an output of said first bistable circuit, and further having a clocking input terminal which receives said clocking signal;

(c) third bistable circuit, having a first input terminal operatively connected to an output of said second bistable circuit, and having a clocking input terminal which receives said free running clock signal and a first output terminal of said third bistable circuit operatively connected to a second input terminal of said third bistable circuit;

(d) first gate element, having a first input terminal operatively connected to a second output terminal of said third bistable circuit, and having a second input terminal which receives said step mode control signal; and (e) second gate element, having a first input terminal operatively connected to said first gate element, and having a second input terminal which receives said free running clock signal, to output said gated clock signal.

* * * * *